(12) United States Patent  
Groenewolt et al.

(10) Patent No.: US 8,790,752 B2
(45) Date of Patent: Jul. 29, 2014

(54) COATING MATERIALS WITH HIGH SOLIDS CONTENT AND GOOD LEVELLING, MULTICOAT PAINT SYSTEMS PRODUCED THEREFROM AND USE THEREOF

(75) Inventors: Matthijs Groenewolt, Münster (DE); Alexandra Steffens, Münster (DE); Wilfred Stübbe, Greven (DE); Wilma Nimz, Haltern (DE)

(73) Assignee: BASF Coatings GmbH, Munster (DE)

( * ) Notice: Subject to any disclaimer, the term of this patent is extended or adjusted under 35 U.S.C. 154(b) by 0 days.

(21) Appl. No.: 13/642,728

(22) PCT Filed: Mar. 30, 2011

(86) PCT No.: PCT/EP2011/054943
§ 371 (c)(1),
(2), (4) Date: Nov. 30, 2012

(87) PCT Pub. No.: WO2011/131463
PCT Pub. Date: Oct. 27, 2011

(65) Prior Publication Data
US 2013/0136865 A1 May 30, 2013

(30) Foreign Application Priority Data

Apr. 21, 2010 (DE) .......................... 10 2010 015 683
Nov. 19, 2010 (EP) ..................................... 10191890

(51) Int. Cl.
| | | |
|---|---|---|
| *B05D 1/36* | (2006.01) | |
| *B05D 1/38* | (2006.01) | |
| *B05D 7/00* | (2006.01) | |
| *C09D 133/10* | (2006.01) | |
| *C09D 175/04* | (2006.01) | |
| *C08G 18/10* | (2006.01) | |
| *C08G 18/28* | (2006.01) | |
| *C08G 18/62* | (2006.01) | |
| *C08G 18/71* | (2006.01) | |
| *C08G 18/77* | (2006.01) | |

(52) U.S. Cl.
CPC .. *B05D 1/36* (2013.01); *B05D 1/38* (2013.01); *B05D 7/53* (2013.01); *B05D 7/534* (2013.01); *C09D 133/10* (2013.01); *C09D 175/04* (2013.01); *C08G 18/10* (2013.01); *C08G 18/289* (2013.01); *C08G 18/6229* (2013.01); *C08G 18/6233* (2013.01); *C08G 18/718* (2013.01); *C08G 18/778* (2013.01)
USPC ..... 427/372.2; 427/379; 427/387; 427/393.5; 427/407.1; 427/412.1; 525/100; 525/102; 525/452; 528/23; 528/26; 528/29; 528/33; 528/38; 252/182.2

(58) Field of Classification Search
CPC .... C09D 133/10; C09D 175/04; C08G 18/10; C08G 18/289; C08G 18/6229; C08G 18/6233; C08G 18/718; C08G 18/778
See application file for complete search history.

(56) References Cited

U.S. PATENT DOCUMENTS

| | | | |
|---|---|---|---|
| 4,598,131 | A | 7/1986 | Prucnal |
| 4,710,542 | A | 12/1987 | Forgione et al. |
| 5,691,439 | A | 11/1997 | Slack et al. |
| 5,716,678 | A | 2/1998 | Rockrath et al. |
| 8,013,099 | B2 | 9/2011 | Poppe et al. |
| 2003/0027921 | A1 | 2/2003 | Speier et al. |
| 2004/0110915 | A1 | 6/2004 | Richter et al. |
| 2010/0015344 | A1* | 1/2010 | Groenewolt et al. ...... 427/407.1 |
| 2010/0028544 | A1* | 2/2010 | Groenewolt et al. ......... 427/384 |
| 2010/0143596 | A1* | 6/2010 | Groenewolt et al. ......... 427/379 |
| 2010/0209613 | A1 | 8/2010 | Rong et al. |
| 2010/0272886 | A1* | 10/2010 | Vaes et al. .................... 427/140 |

FOREIGN PATENT DOCUMENTS

| | | |
|---|---|---|
| DE | 102005045228 A1 | 4/2007 |
| EP | 0008127 B1 | 4/1982 |
| EP | 0245700 B1 | 11/1987 |
| EP | 0249201 A2 | 12/1987 |
| EP | 0276501 A2 | 8/1988 |
| EP | 0692007 B1 | 1/1996 |
| EP | 0949284 A1 | 10/1999 |
| EP | 0994117 A1 | 4/2000 |
| EP | 1193278 A1 | 4/2002 |
| EP | 0864575 B1 | 9/2002 |
| EP | 1273640 A2 | 1/2003 |
| EP | 1426393 A2 | 6/2004 |

(Continued)

OTHER PUBLICATIONS

English Translation of International Search Report for International Application No. PCT/EP2011/054943 mailed Oct. 12, 2011, 2 pages.
Written Opinion for International Application No. PCT/EP2011/054943 mailed Oct. 12, 2011, 6 pages.

(Continued)

*Primary Examiner* — Erma Cameron
(74) *Attorney, Agent, or Firm* — Cantor Colburn LLP

(57) ABSTRACT

Disclosed is a coating composition based on aprotic solvents and comprising at least one hydroxyl-containing compound (A) and at least one compound (B) having isocyanate groups and having at least one silane group of the formula (I)

$$—X—Si—R''_x G_{3-x} \quad (I)$$

with
G=identical or different hydrolyzable groups,
R'=hydrogen, alkyl or cycloalkyl,
X=organic radical,
R''=alkyl, cycloalkyl, aryl or aralkyl,
x=0 to 2,
and characterized in that
(i) the compound (B) containing isocyanate groups and silane groups comprises uretdione groups, and
(ii) the compound (B) has been prepared from a linear aliphatic diisocyanate.
The present invention additionally provides multistage coating methods using these coating compositions, and the use of the coating compositions as clearcoat, and application of the coating method for automotive refinish and/or for the coating of plastics substrates.

20 Claims, No Drawings

(56) References Cited

FOREIGN PATENT DOCUMENTS

| | | |
|---|---|---|
| EP | 1837355 A2 | 9/2007 |
| WO | WO9422968 A1 | 10/1994 |
| WO | WO9712945 A1 | 4/1997 |
| WO | WO0109260 A1 | 2/2001 |
| WO | WO0198393 A1 | 12/2001 |
| WO | WO2005003340 A2 | 1/2005 |
| WO | WO2008074489 A1 | 6/2008 |
| WO | WO2008074490 A1 | 6/2008 |
| WO | WO2008074491 A1 | 6/2008 |
| WO | WO2010135021 A1 | 11/2010 |

OTHER PUBLICATIONS

English Translation of International Preliminary Report on Patentability for International Application No. PCT/EP2011/054943 issued Oct. 23, 2012, 9 pages.

Römpp Lexikon "Lacke und Druckfarben" Georg Thieme Verlag, Stuttgart, 1998, pp. 250 to 252.

Machine translation of Römpp Lexikon "Lacke und Druckfarben" Georg Thieme Verlag, Stuttgart, 1998, pp. 250 to 252.

B. Singh et al., "Carbamylmethylated Melamines, Novel Crosslinkers for the Coatings Industry", in Advanced Organic Coatings Science and Technology Series, 1991, pp. 193 to 207. vol. 13.

\* cited by examiner

COATING MATERIALS WITH HIGH SOLIDS CONTENT AND GOOD LEVELLING, MULTICOAT PAINT SYSTEMS PRODUCED THEREFROM AND USE THEREOF

CROSS REFERENCE TO RELATED APPLICATIONS

This application is a National Phase Application of Patent Application PCT/EP2011/054943 filed on 30 Mar. 2011, which claims priority to DE 10 2010 015683.3, filed 21 Apr. 2010 and EP 10191890.2 filed 19 Nov. 2010, of which all applications are hereby incorporated by reference herein in their entirety.

FIELD OF THE INVENTION

The present invention relates to coating compositions based on aprotic solvents and comprising at least one oligomeric and/or polymeric, hydroxyl-containing compound (A) and also at least one compound (B) having isocyanate groups and having silane groups.

BACKGROUND OF THE INVENTION

Coating compositions of this kind are known from WO 08/74491, WO 08/74490, and WO 08/74489, for example. The compound (B) used in these coating compositions and containing isocyanate groups and silane groups is based on known isocyanates, preferably on the biuret dimers and isocyanurate trimers of diisocyanates, more particularly of hexamethylene diisocyanate. These coating compositions of WO 08/074,489 have the advantage over conventional polyurethane coating compositions of significantly enhanced scratch resistance in tandem with good weathering stability. The coating compositions described therein are used more particularly in automotive OEM finishing, although their use in automotive refinish is also described. A disadvantageous aspect to these coating compositions, however, is that a reduction in the solvent fraction, in other words an increase in the nonvolatile fraction, of the coating compositions is associated with a deterioration in the flow properties and hence with a significant impairment of the optical quality of the resultant coatings.

Coating compositions used for the automotive refinish segment, however, are affected by statutory emissions guidelines (e.g., German Federal Airborne Pollutants Ordinance 31). The current European directive prescribes for clearcoat systems a VOC ("volatile organic content") of 420 g/l, resulting, depending on the density of the system used, in nonvolatile fractions of around 60% by weight. A problematic aspect in the development of systems having a high nonvolatile fraction is that in general there is an increase in viscosity and hence a reduction in the fluidity of the system, with adverse consequences for the flow and topcoat holdout. To counteract this effect, it is necessary to raise the nonvolatile fraction while maintaining the same viscosity. This is generally achieved by reducing the viscosity of the curing agent and/or of the binder. Doing so, however, often entails a deterioration in physical film formation, and results in longer drying times. Especially for coating compositions which are used in the automotive refinish segment, this condition is disadvantageous, since the coating compositions used in the refinish segment offer long reaction times in any case.

U.S. Pat. No. 5,691,439 discloses coating compositions which, in addition to hydroxyl-containing binders (A), comprise compounds (B) with isocyanate groups as crosslinkers, it being essential to the invention that the compounds (B) also have silane groups or siloxane groups, in order to lower the surface energy, and also have allophanate groups, in order to obtain transparent coatings, meaning that coatings are obtained which have improved surface properties. That specification, however, lacks details as to how the solvent fraction of the coating compositions can be lowered while nevertheless ensuring high cure rates even under the conditions of automotive refinish.

Furthermore, EP-A-1 273 640 describes 2K [2-component] coating compositions, comprising a polyol component and a crosslinker component, consisting of aliphatic and/or cycloaliphatic polyisocyanates or the polyisocyanates derived from them by polymerization, allophanatization, biuretization or urethanization, with 0.1 to 95 mol % of the originally free isocyanate groups present having undergone reaction with bisalkoxysilylamine. These coating compositions can be used for producing clearcoats or topcoats in the automotive segment and, when they have fully cured, exhibit high scratch resistance in conjunction with high resistance to environmental influences. That specification, however, lacks details as to how the solvent fraction of the coating compositions can be lowered while still ensuring high cure rates, even under the conditions of automotive refinish, and without detraction from the surface properties of the resultant coatings.

WO 2001/98393 describes 2K [2-component] coating compositions which comprise a polyol as binder component and, as crosslinker component, a polyisocyanate functionalized in low fractions with alkoxysilylamines, preferably with bisalkoxysilylamines. These coating compositions are to employed particularly as primers and are optimized for adhesion to metallic substrates, preferably to aluminum substrates.

Hitherto unpublished international patent application PCT/US 2010/028308 describes coating compositions which in addition to a hydroxyl-containing component (A) and an isocyanate-group-containing component (B) comprise the reaction product of a uretdione with a bisalkoxysilylamine or with a monoalkoxysilylamine, but the reaction production of the uretdione with the alkoxysilylamine no longer contains any residual isocyanate groups.

EP-B-864 575 describes compounds having alkoxysilane groups and urea groups and obtained by reacting polyisocyanates, such as uretdiones and/or isocyanurates, for example, with secondary monoalkoxysilylamines containing ester groups, such as, more particularly, diethyl N-(3-trimethoxysilylpropyl)aspartate. The compounds having alkoxysilane groups and urea groups no longer contain substantially any remaining isocyanate groups, and according to EP-B-864 575 are used, optionally together with further silane-group-containing components, in coating compositions which cure exclusively by way of silane polycondensation. The use of these compounds having alkoxysilane groups and urea groups together with hydroxy-containing components and isocyanate-group-containing components, on the other hand, is not described in EP-B-864 575.

Lastly, EP-A-1 426 393 discloses polyisocyanates which contain uretdione groups, are of low monomer content, and have the advantage, moreover, that their stability with respect to retrograde cleavage is improved over that of the uretdiones formerly used. This improved stability with respect to retrograde cleavage is acquired by dimerizing the uretdiones at temperatures of $\leq 40°$ C. in the presence of trialkylphosphines and then separating off the trialkylphosphines. The uretdiones are used, for example, as curing agents in coating compositions. That specification, however, lacks details of how the surface properties of the resultant coatings can be influenced, and details as to how effective curing can be ensured even under the conditions of refinish.

The problem addressed by the present invention, therefore, was that of providing coating compositions, more particularly for automotive refinish, which ensure effective curing even under refinish conditions, have a high solids content and hence a very low solvent content, exhibit good flow and topcoat holdout, and lead to coatings having good surface properties.

The overall optical appearance was assessed by measuring the surface profile of the applied and baked coating films, using the wavescan method, which allows measurement of the visible profile of coating film surfaces. For this purpose, the intensity of reflection ("waviness") was measured by means of the Byk-Gardner Wave Scan instrument, recording 1250 measurement points over a distance of 10 cm. The instrument divides the reflection into longwavedness ("long-wave"), i.e., the variance in light intensity for structures in the range from 0.6 mm to 10 mm, and into shortwavedness ("short-wave"), i.e., the variance in light intensity for structures in the range from 0.1 mm to 0.6 mm. For a good appearance, low long-wave measurement values in the resultant coatings, for very low film thicknesses, are particularly critical.

Furthermore, the intention was to provide coating compositions which lead to a highly weathering-stable network and which at the same time ensure high acid resistance. In addition, the intention was that the coating compositions should lead to coatings which are highly scratch-resistant and more particularly exhibit a high level of gloss retention after scratch exposure. Moreover, the coatings and paint finishes, especially the clearcoats, ought to be able to be produced even in film thicknesses >40 μm without stress cracks occurring. Furthermore, the coating compositions ought to meet the requirements typically imposed on the clearcoat film in automotive OEM finishes and automotive refinishes.

Finally, the new coating compositions ought to be producible easily and with very good reproducibility, and ought not to cause any environmental problems in the course of paint application.

SUMMARY OF THE INVENTION

In light of the above-identified problem statement, coating compositions have been found that are based on aprotic solvents, comprising at least one oligomeric and/or polymeric, hydroxyl-containing compound (A) and at least one compound (B) having isocyanate groups and having at least one silane group of the formula (I)

(I)

with
G=identical or different hydrolyzable groups, particularly G=alkoxy group (OR'),
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=ethyl and/or methyl,
X=organic radical, more particularly linear and/or branched alkylene or cycloalkylene radical having 1 to 20 carbon atoms, very preferably X=alkylene radical having 1 to 4 carbon atoms,
R"=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R"=alkyl radical, more to particularly having 1 to 6 C atoms,
x=0 to 2, preferably 0 to 1, more preferably x=0 characterized in that
(i) the compound (B) containing isocyanate groups and silane groups contains uretdione groups, and
(ii) the compound (B) has been prepared from a linear aliphatic diisocyanate (DI).

The present invention additionally provides multistage coating methods using these coating compositions, and the use of the coating compositions as clearcoat, and application of the coating method for the coating of components for installation in or on automobiles, and/or of plastics substrates and for automotive refinish.

In light of the prior art it was surprising and unforeseeable for the skilled worker that the problems addressed by the present invention could be solved with the aid of the coating compositions of the invention.

Hence it is surprising in particular that the coating compositions of the invention exhibit effective curing even under refinish conditions, have a high solids content and hence a very low solvent content, exhibit good flow and topcoat holdout, and lead to coatings having good surface properties. The resultant coatings, accordingly, have the low long-wave measurement values at very low film thicknesses that are important particularly for a good appearance.

Furthermore, the coating compositions result in a highly weathering-stable network and at the same time ensure high acid resistance. In addition, the coating compositions give coatings which are highly scratch-resistant and more particularly exhibit a high level of gloss retention after scratch exposure. Moreover, the coatings and paint finishes, especially the clearcoats, can be produced even at film thicknesses >40 μm without to stress cracks occurring. Over and above these qualities, the coating compositions meet the requirements typically imposed on the clearcoat film in automotive OEM finishes and automotive refinishes.

Lastly, the new coating compositions can be produced easily and very reproducibly, and do not give rise to any environmental problems during paint application.

DETAILED DESCRIPTION OF AN EMBODIMENT OF THE INVENTION

The Coating Compositions of the Invention

The coating compositions of the invention are, more particularly, thermally curable coating compositions, i.e., preferably, coating compositions which are substantially free from radiation-curable unsaturated compounds, being more particularly completely free from radiation-curable unsaturated compounds.

The Isocyanate-group-containing Compounds (B)

As component (B) the coating compositions of the invention comprise one or more compounds having free, i.e., non-blocked, and/or blocked isocyanate groups. The coating compositions of the invention preferably comprise compounds (B) having free isocyanate groups. The free isocyanate groups of the isocyanate-group-containing compounds B may also be used, however, in blocked form. This is preferentially the case when the coating compositions of the invention are employed in the form of one-component systems.

It is essential to the invention that the isocyanate-group-containing compound used as component (B) in the coating composition has been prepared from at least one linear aliphatic diisocyanate (DI). This ensures that the resultant compounds (B) can be used in the form of high-solids solutions having a solids content of more than 70% by weight, more particularly at least 75% by weight, in the coating compositions of the invention, while at the same time producing coatings whose surface properties, such as the flow in particular, are very good.

The isocyanate-group-containing compound used as component (B) in the coating composition has preferably been prepared from at least one linear aliphatic diisocyanate (DI) having 3 to 12 C atoms, more particularly having 4 to 10 C atoms, and especially having 5 to 6 C atoms.

Examples of the linear aliphatic diisocyanates (DI) suitable for preparing component (B) are butane diisocyanate, pentane diisocyanate, hexane diisocyanate, heptane diisocyanate, octane diisocyanate, nonane diisocyanate, decane diisocyanate, undecane diisocyanate, dodecane diisocyanate, and, more particularly, hexane diisocyanate.

Furthermore, it is essential to the invention that isocyanate-group-containing compound (B) contains uretdione groups as well as the free and/or blocked isocyanate groups. As a result of this use of isocyanate-group-containing compounds having uretdione groups, in contrast to the use of isocyanurates and in contrast to the use of biurets and/or allophanates of the same diisocyanates, coatings are obtained that have substantially better surface properties, more particularly having lower long-wave values. The long-wave values of the applied and baked coating films are measured by means of the wavescan method, which allows measurement of the visible profile of coating film surfaces. For this purpose, the intensity of reflection ("waviness") was measured by means of the Byk-Gardner Wave Scan instrument, recording 1250 measurement points over a distance of 10 cm. The instrument divides the reflection into longwavedness ("long-wave"), i.e., the variance in light intensity for structures in the range from 0.6 mm to 10 mm, and into shortwavedness ("short-wave"), i.e., the variance in light intensity for structures in the range from 0.1 mm to 0.6 mm.

Preferably, therefore, the compound (B) has been prepared from a polyisocyanate (PI) having a uretdione group content >50 mol %, preferably more than 50 to 90 mol %, more preferably 65 to 80 mol %, based in each case on the entirety of the structural types formed by isocyanate oligomerization of the linear aliphatic diisocyanate (DI). Uretdiones suitable for preparing component (B) are also described, for example, in EP-A-1 426 393, page 2, paragraph [0012], to page 4, paragraph [0030].

It is known that commercial uretdiones may contain 5% to 30% by weight of the corresponding isocyanurate of the respective diisocyanate, based in each case on the total weight of the commercial product. This isocyanurate fraction is not necessarily preferred, but generally also causes no problems in the context of the subsequent reaction with the below-stated silane-group-containing compounds (IIa) and (IIIa). In that case, however, on reaction of the commercial uretdione with the below-stated silane-group-containing compounds (IIa) and (IIIa as well as the uretdione-group-containing compounds (B) of the invention, the correspondingly functionalized isocyanurates are obtained as well. These functionalized isocyanurates must then be considered formally to belong not to the uretdione-group-containing component (B), but rather to the component (BS) described in detail below.

The isocyanate-group-containing compound used as component (B) in the coating composition comprises, in addition to the free and/or blocked isocyanate groups and in addition to the uretdione groups, at least one silane group of the formula (I)

with
G=identical or different hydrolyzable groups, particularly G=alkoxy group (OR'),
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=ethyl and/or methyl,
X=organic radical, more particularly linear and/or branched alkylene or cycloalkylene radical having 1 to 20 carbon atoms, very preferably X=alkylene radical having 1 to 4 carbon atoms,
R"=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R"=alkyl radical, more particularly having 1 to 6 C atoms,
x=0 to 2, preferably 0 to 1, more preferably x=0.

Preferably the coating composition comprises at least one isocyanate-group-containing compound (B) which in addition to the free and/or blocked isocyanate groups and in addition to the uretdione groups further comprises at least one structural unit (II) of the formula (II)

and at least one structural unit (III) of the formula (III)

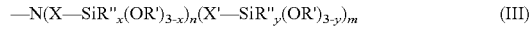

where
R=hydrogen, alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=ethyl and/or methyl,
X, X'=linear and/or branched alkylene or cycloalkylene radical having 1 to 20 carbon atoms, preferably X, X'=alkylene radical having 1 to 4 carbon atoms,
R"=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R"=alkyl radical, more particularly having 1 to 6 C atoms,
n=0 to 2, m=0 to 2, m+n=2, and x, y=0 to 2.

The respective preferred alkoxy radicals (OR') may be alike or different, what is critical for the construction of the radicals, however, is to what extent they influence the reactivity of the hydrolyzable silane groups. Preferably R' is an alkyl radical, more particularly having 1 to 6 C atoms. Particularly preferred radicals R' are those which increase the reactivity of the silane groups, i.e., which represent good leaving groups. In this sense, a methoxy radical is preferred over an ethoxy radical, which in turn is preferred over a propoxy radical. With particular preference, therefore, R'=ethyl and/or methyl, more particularly methyl.

The reactivity of organofunctional silanes may also be influenced considerably, furthermore, by the length of the spacers X, X' between silane functionality and organic functional group serving for reaction with the modifying constituent. By way of example of this, mention may be made of the "alpha" silanes, which are available from the company Wacker, and in which there is a methylene group, rather than the propylene group present in the case of "gamma" silanes, between Si atom and functional group.

The isocyanate-group-containing compounds (B) used in accordance with the invention and functionalized with the structural units (II) and (III) are obtained more preferably by reaction of the uretdione-group-containing polyisocyanates (PI)—prepared by oligomerizing the linear aliphatic diisocyanates (DI)—with at least one compound of the formula (IIa)

$$H-NR-(X-SiR''_x(OR')_{3-x})\quad\quad\quad\quad\quad\quad\text{(IIa)},$$

to and with at least one compound of the formula (IIIa)

$$HN(X-SiR''_x(OR')_{3-x})_n(X'-SiR''_y(OR')_{3-y})_m\quad\text{(IIIa)},$$

the substituents being as defined above.

Inventively preferred compounds (IIIa) are bis(2-ethyltrimethoxysilyl)amine, bis(3-propyltrimethoxysilyl)amine, bis (4-butyltrimethoxysilyl)amine, bis(2-ethyltriethoxysilyl) amine, bis(3-propyltriethoxysilyl)amine and/or bis(4-butyltriethoxysilyl)amine. Especially preferred is bis(3-propyltrimethoxysilyl)amine. Aminosilanes of this kind are available, for example, under the brand name Dynasylan® from Degussa or Silquest® from OSI.

Inventively preferred compounds (IIa) are aminoalkyltrialkoxysilanes, such as, preferably, 2-aminoethyltrimethoxysilane, 2-aminoethyltriethoxysilane, 3-aminopropyltrimethoxysilane, 3-aminopropyltriethoxysilane, 4-aminobutyltrimethoxysilane, 4-aminobutyltriethoxysilane. Particularly preferred compounds (Ia) are N-(2-(trimethoxysilyl)ethyl)alkylamines, N-(3-(trimethoxysilyl)propyl)alkylamines, N-(4-(trimethoxysilyl)butyl)alkyl-amines, N-(2-(triethoxysilyl)ethyl)alkylamines, N-(3-(triethoxy-silyl)propyl)alkylamines and/or N-(4-(triethoxysilyl)butyl) alkylamines. Especially preferred is N-(3-(trimethoxysilyl) propyl)butylamine. Aminosilanes of this kind are available, for example, under the brand name Dynasylan® from Degussa or Silquest® from OSI.

It is preferred for the isocyanate-group-containing compound (B) to have between 2.5 and 90 mol %, more particularly 5 to 85 mol %, and very particularly 7.5 to 80 mol %, of at least one structural unit (II) of the formula (II), and 10.0 to 97.5 mol %, more particularly 15 to 95 mol %, and very particularly 20 to 92.5 mol %, of at least one structural unit (III) of the formula (III), based in each case on the entirety of the structural units (II) and (III).

It is particularly preferred for the total fraction of the isocyanate groups in the polyisocyanate (PI) that are reacted to form the structural units (II) and/or (III) to be between 5 and 95 mol %, preferably between 10 and 85 mol %, and more preferably between 15 and 70 mol %.

Especially preferred isocyanate-group-containing compounds (B) are reaction products of the uretdione of hexamethylene 1,6-diisocyanate with bis(3-propyltrimethoxysilyl) amine and N-(3-(trimethoxysilyl)propyl)butyl-amine.

The solids content of the polyisocyanate curing agent (B) used in accordance with the invention is advantageously more than 70% by weight, preferably at least 75% by weight.

In addition to the inventively essential component (B), the coating composition may further comprise one or more compounds (BS) which are different from component (B) and which have free and/or blocked isocyanate groups. The coating compositions of the invention preferably comprise compounds (BS) having free isocyanate groups. The free isocyanate groups of the isocyanate-group-containing components (BS), however, may also be used in blocked form. This is then the case preferably when the coating compositions of the invention are used as one-component systems.

As compound (BS) it is possible to use substituted or unsubstituted, aromatic, aliphatic, cycloaliphatic and/or heterocyclic diisocyanates and/or polyisocyanates that are known per se. Examples of preferred polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diiso-cyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylene dicyclohexyl diisocyanate (e.g., Desmodur® W from Bayer AG), tetramethylxylyl diisocyanates (e.g., TMXDI® from American Cyanamid), and mixtures of the aforementioned polyisocyanates. Additionally preferred polyisocyanates are the biuret dimers and the isocyanurate trimers of the aforementioned diisocyanates.

Particularly preferred compounds (BS) are hexamethylene 1,6-diisocyanate, isophorone diisocyanate and 4,4'-methylenedicyclohexyl diisocyanate, their biuret dimers and/or isocyanurate trimers.

In another embodiment of the invention the compounds (BS) are polyisocyanate prepolymers with urethane structural units, and are obtained by reaction of polyols with a stoichiometric excess of aforementioned polyisocyanates. Such polyisocyanate prepolymers are described in U.S. Pat. No. 4,598, 131, for example.

As component (BS) it is also possible to use isocyanate-group-containing compounds (BS) that are functionalized with structural units (I), (II) and/or (III). The compounds (BS) then differ from component (B) generally in that they have no amounts or at most small amounts of uretdione groups.

The isocyanate-group-containing compounds (BS) functionalized with the structural units (II) and (III) are prepared with particular preference by reacting the aforementioned diisocyanates and/or polyisocyanates with the aforementioned compounds (IIa) and (IIIa), by reacting between 2.5 and 90 mol %, preferably 5 to 85 mol %, more preferably 7.5 to 80 mol %, of the isocyanate groups in the parent polyisocyanate structure with at least one compound (IIa)

$$H-NR-(X-SiR''_x(OR')_{3-x})\quad\quad\quad\quad\quad\quad\text{(IIa)},$$

and
between 2.5 and 90 mol %, preferably 5 to 85 mol %, more preferably 7.5 to 80 mol % of the isocyanate groups in the parent polyisocyanate structure with at least one compound (IIIa)

$$HN(X-SiR''_x(OR')_{3-x})_n(X'-SiR''_y(OR')_{3-y})_m\quad\text{(IIIa)},$$

the substituents being as defined above. The total proportion of the isocyanate groups that are reacted with the compounds (IIa) and (IIIa) in the polyisocyanate compound (BS) is between 5 and 95 mol %, preferably between 10 and 90 mol %, more preferably between 15 and 85 mol % of the isocyanate groups in the parent polyisocyanate structure.

Particularly preferred isocyanate-group-containing compounds (BS) functionalized with silane groups are reaction products of hexamethylene 1,6-diisocyanate and/or isophorone diisocyanate, and/or their isocyanurate trimers, with bis (3-propyltrimethoxysilyl)amine and/or N-(3-(trimethoxysilyl)propyl)butylamine.

In addition to this or these compound or compounds (BS) added separately to the coating compositions of the invention, component (BS) also includes the fractions of isocyanate-group-containing compounds functionalized with silane groups, which compounds are introduced into the coating composition by way of the fraction of isocyanurates and/or higher homologs that is frequently present in commercial uretdiones.

Where, in addition to component (B), the coating composition also comprises one or more compounds (BS) which are different from component (B) and which have free and/or blocked isocyanate groups, the total fraction of isocyanate groups reacted to form the silane structural units (I), (II) and (III) is between 5 and 95 mol %, preferably between 10 and 90 mol %, more preferably between 15 and 85 mol %, based in each case on all of the isocyanate groups originally present in component (B) plus in component (BS).

Where, in addition to component (B), the coating composition also comprises one or more compounds (BS) which are different from component (B) and which have free and/or blocked isocyanate groups, the mixture ratio of the uretdione-group-containing component (B) to the component (BS) is preferably between 1.0 equivalent of component (B) to 40.0 equivalents of component (BS) and 1.0 equivalent of component (B) to 0.01 equivalents of component (BS), more preferably between 1.0 equivalent of component (B) to 30.0 equivalents of component (BS) and 1.0 equivalent of component (B) to 0.02 equivalents of component (BS), and very particularly preferably between 1.0 equivalent of component (B) to 25.0 equivalents of component (BS) and 1.0 equivalent of component (B) to 0.05 equivalents of component (BS).

The equivalents of the compound (B) and (BS), respectively, are determined in this case in the usual way, by dividing the amount employed, in grams, by the equivalent weight of the compound (B) or (BS). The fraction of isocyanurate-group-containing compounds that may be present in commercial compounds (B) containing uretdione groups is assigned to component (B), for simplification, when calculating the mixture ratio in equivalents; in other words, in the calculation set out subsequently, an idealized compound (B) is assumed, particularly since the fraction of isocyanurate-group-containing compound in (B), which is low at most, and may not be present at all, would have only an extremely small influence on the equivalent ratio.

To determine the equivalent weight of the compound (B), an arithmetic determination is first of all made of the equivalent weight EEW of the silane-group-free compound (B) in grams, in a known way, from the isocyanate group content measured in accordance with DIN EN ISO 3219/A.3, in % by weight, as follows:

EEW(B silane-free)=(100% by weight*42 g)/isocyanate content in % by weight

The equivalent weight EEW of the silanized compound (B) in grams is likewise determined arithmetically by means of the above-described equivalent weight EEW of the nonsilanized compound (B), the fraction of the silanized isocyanate groups c, the fraction of silane units (I) as1, the fraction of silane units (II) as2, the fraction of silane units (III) as3, and also the theoretical equivalent weights of the silane units, (I), (II) and (III), as follows:

EEW(B silanized)=EEW(B silane-free)+c*[(as1*EEW(I))+(as2*EEW (II))+(as3*EEW (III))]

where
c=degree of conversion of the isocyanate groups originally present in B to silane units of the formulae (I)+(II)+(III) in mol %, divided by 100 mol %
as1=fraction of the isocyanate groups reacted in B to give the structural units (I), in mol %, divided by 100 mol %, with the proviso that the sum of the structural units (I)+(II)+(III) is always 100 mol %
as2=fraction of the isocyanate groups reacted in B to give the structural units (II), in mol %, divided by 100 mol %, with the proviso that the sum of the structural units (I)+(II)+(III) is always 100 mol %
as3=fraction of the isocyanate groups reacted in B to give the structural units (III), in mol %, divided by 100 mol %, with the proviso that the sum of the structural units (I)+(II)+(III) is always 100 mol %
EEW(I)=equivalent weight, determined arithmetically from the structural formula, for the structural unit (I): —X—Si—R"xG3-x, where X, R", G, and x are as defined above for formula (I)
EEW(II)=equivalent weight, determined arithmetically from the structural formula, for the structural unit (II): —NR—(X—SiR"x(OR')3-x), where X, R, R", R', and x are as defined above for formula (II)
EEW(III)=equivalent weight, determined arithmetically from the structural formula, for the structural unit (III): —N(X—SiR"x(OR')3-x)$_n$(X'—SiR"y(OR')3-y)$_m$, where X, R", R', and x are as defined above for formula (III).

In order to determine the equivalent weight of the compound (BS), an arithmetic determination is first made, in turn, of the equivalent weight EEW of the silane-group-free compound (BS), in grams, in a known way from the isocyanate group content measured in according with DIN EN ISO 3219/A.3, in % by weight, as follows:

EEW(BS silane-free)=(100% by weight*42 g)/isocyanate content in % by weight

The equivalent weight EEW of the silanized compound (BS) in grams is likewise determined arithmetically by means of the above-described equivalent weight EEW of the nonsilanized compound (BS), the fraction of the silanized isocyanate groups c', the fraction of silane units (I) as'1, the fraction of silane units (II) as'2, the fraction of silane units (III) as'3, and to also the theoretical equivalent weights of the silane units, (I), (II) and (III), as follows:

EEW(BS silanized)=EEW(BS silane-free)+c'*[(as1*EEW(I))+(as'2*EEW(II))+(as'3*EEW (III))]

where
c'=degree of conversion of the isocyanate groups originally present in (BS) to silane units of the formulae (I)+(II)+(III) in mol %, divided by 100 mol %
as'1=fraction of the isocyanate groups reacted in BS to give the structural units (I), in mol %, divided by 100 mol %, with the proviso that the sum of the structural units (I)+(II)+(III) is always 100 mol %
as'2=fraction of the isocyanate groups reacted in BS to give the structural units (II), in mol %, divided by 100 mol %, with the proviso that the sum of the structural units (I)+(II)+(III) is always 100 mol %
as'3=fraction of the isocyanate groups reacted in BS to give the structural units (III), in mol %, divided by 100 mol %, with the proviso that the sum of the structural units (I)+(II)+(III) is always 100 mol %.

The Hydroxyl-containing Compound (A)

As hydroxyl-containing compound (A), use is made of at least one oligomeric and/or polymeric polyol.

The preferred oligomeric and/or polymeric polyols (A) have mass-average molecular weights Mw>500 daltons, as measured by means of gel permeation chromatography (GPC) against a polystyrene standard, preferably of between 800 and 100 000 daltons, more particularly between 1000 and 50 000 daltons.

Particular preference is given to polyester polyols, polyurethane polyols, polysiloxane polyols, polyacrylate polyols and/or polymethacrylate polyols, and also their copolymers, referred to below as polyacrylate polyols.

The polyols preferably have an OH number of 30 to 400 mg KOH/g, more particularly between 100 and 300 KOH/g. The hydroxyl number (OH number) indicates how many mg of potassium hydroxide are equivalent to the amount of acetic acid bound by 1 g of substance on acetylation. It is determined by boiling the sample with acetic anhydride-pyridine and titrating the resultant acid against potassium hydroxide solution (DIN 53240-2).

The glass transition temperatures as measured by DSC in accordance with DIN-EN-ISO 11357-2 for the polyols are preferably between −150 and 100° C., more preferably between −120° C. and 80° C.

Suitable polyester polyols are described in EP-A-0 994 117 and EP-A-1 273 640, for example. Polyurethane polyols are prepared preferably by reaction of polyester polyol prepolymers with suitable diisocyanates or polyisocyanates, and are described in EP-A-1 273 640, for example. Suitable polysiloxane polyols are described in WO-A-01/09260, for example, it being possible for the polysiloxane polyols cited therein to be employed preferably in combination with other polyols, more particularly those having higher glass transition temperatures.

The poly(meth)acrylate polyols that are especially preferred in accordance with the invention are generally copolymers and preferably have mass-average molecular weights Mw of between 1000 and 20 000 daltons, more particularly between 1500 and 10 000 daltons, in each case as measured by gel permeation chromatography (GPC) against a polystyrene standard.

The glass transition temperature of the copolymers is generally between −100 and 100° C., more particularly between −50 and 80° C. (as measured by DSC in accordance with DIN-EN-ISO 11357-2).

The poly(meth)acrylate polyols preferably have an OH number of 60 to 250 mg KOH/g, more particularly between 70 and 200 KOH/g, and an acid number of between 0 and 30 mg KOH/g.

The hydroxyl number (OH number) indicates how many mg of potassium hydroxide are equivalent to the amount of acetic acid bound by 1 g of substance on acetylation. It is determined by boiling the sample with acetic anhydride-pyridine and titrating the resultant acid against potassium hydroxide solution (DIN 53240-2). The acid number here indicates the number of mg of potassium hydroxide consumed in neutralizing 1 g of the respective compound (DIN EN ISO 2114).

As hydroxyl-containing monomer units it is preferred to use hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and, more particularly, 4-hydroxybutyl acrylate and/or 4-hydroxybutyl methacrylate.

As further monomer units for the poly(meth)acrylate polyols it is preferred to use alkyl methacrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate, or, in particular, cyclohexyl acrylate and/or cyclohexyl methacrylate.

As further monomer units for the poly(meth)acrylate polyols it is possible to use vinylaromatic hydrocarbons, such as vinyltoluene, alpha-methylstyrene or, in particular, styrene, amides or nitriles of acrylic acid or methacrylic acid, vinyl esters or vinyl ethers, and also, in minor amounts, in particular, acrylic acid and/or methacrylic acid.

For further increasing the solids content of the coating compositions of the invention and further improving the surface quality (lower long-wave values), particularly in the case of a relatively low degree of silanization of the compound (B), use is made more particularly of lactone-modified, hydroxyl-containing, oligomeric and/or polymeric compounds (A). Particular preference is given to using ε-caprolactone-modified, hydroxyl-containing, oligomeric and/or polymeric compounds (A), and very particular preference to using ε-caprolactone-modified, hydroxyl-containing, polyacrylate polyols and/or ε-caprolactone-modified, hydroxyl-containing polymethacrylate polyols.

The lactone-modified, especially ε-caprolactone-modified, hydroxyl-containing, oligomeric and/or polymeric compounds (A) can be prepared in a manner known to the skilled worker by first preparing the hydroxyl-containing oligomeric and/or polymeric compounds and then reacting them with lactone or with ε-caprolactone. An alternative option is first to subject a portion of the monomeric synthesis components, more particularly a portion of the hydroxyl-containing monomeric synthesis components, to reaction with the lactone, or with ε-caprolactone, and then to construct the lactone-modified or ε-caprolactone-modified oligomer or polymer. Hydroxyl-containing compounds (A) modified with lactone, or with ε-caprolactone, are also described in, for example, U.S. Pat. No. 4,546,046, column 4 line 24 to column 7 line 6.

In another embodiment of the invention the hydroxyl-containing compound A may also contain silane groups (I) as well as the hydroxyl groups.

The Combination of Components (A) and (B), and Further Components of the Coating Composition The weight fractions of the polyol (A) and of the polyisocyanate (B) are preferably selected such that the molar equivalent ratio of the unreacted isocyanate groups of the isocyanate-containing compounds (B) to the hydroxyl groups of the hydroxyl-containing compounds (A) is between 0.8:1 and 1:1.2, preferably between 0.9:1 and 1.1:1, more preferably between 0.95:1 and 1.05:1.

It is preferred in accordance with the invention to use coating compositions which comprise from 20% to 80% by weight, preferably from 30% to 70% by weight, based in each case on the solids content of the coating composition, of at least one hydroxyl-containing polyacrylate (A) and/or of at least one hydroxyl-containing polymethacrylate (A).

It is preferred in accordance with the invention to use coating compositions which comprise from 20% to 80% by weight, preferably from 30% to 70% by weight, based in each case on the solids content of the coating composition, of at least one isocyanate-group-containing compound (B).

Where the coating composition, in addition to component (B), also comprises one or more compounds (BS) which are different from component (B) and which have free and/or blocked isocyanate groups, the weight fractions of the polyol (A), of the polyisocyanate (B) and of the polyisocyanate (BS) are preferably selected such that the molar equivalent ratio of the unreacted isocyanate groups of the isocyanate-containing compounds (B) plus (BS) to the hydroxyl groups of the hydroxyl-containing compounds (A) is between 0.8:1 and 1:1.2, preferably between 0.9:1 and 1.1:1, more preferably between 0.95:1 and 1.05:1.

In the case of one-component coating compositions, the isocyanate-group-containing compounds (B) and, optionally, (BS) selected are those whose free isocyanate groups are blocked with blocking agents. The isocyanate groups may be blocked, for example, with substituted pyrazoles, more particularly with alkyl-substituted pyrazoles, such as 3-methylpyrazole, 3,5-dimethylpyrazole, 4-nitro-3,5-dimethypyrazole, 4-bromo-3,5-dimethylpyrazole, and so on. With particular preference the isocyanate groups of components (B1) and (B2) are blocked with 3,5-dimethylpyrazole.

In the case of the inventively preferred 2-component (2K) coating compositions, a film-forming component comprising the hydroxyl-containing compound (A) and also further components, described below, is mixed, shortly before the coating composition is applied, with a further film-forming component, comprising the isocyanate-group-containing compound (B) and, optionally, (BS) and, optionally, other of the components described below, mixing taking place in a conventional way, with—generally speaking—the film-forming component which comprises the compound (A) comprising the catalyst and also a portion of the solvent.

If desired, in addition to the hydroxyl-containing component (A), the coating compositions of the invention may comprise one or more hydroxyl-containing compounds (C), which are different from component (A). Preferably these compounds (C) account for a fraction of 10% to 50% by weight, more preferably from 20% to 40% by weight, based on the nonvolatile fraction of the polyol component (A)+(C).

As hydroxyl-containing compound (C) use is made not only of low molecular mass polyols but also of oligomeric and/or polymeric polyols different from component (A).

Low molecular mass polyols used are, for example, diols, such as, preferably, ethylene glycol, neopentylglycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols, such as, preferably, trimethylolethane, trimethylolpropane, trimethylolhexane, 1,2,4-butanetriol, pentaerythritol, and dipentaerythritol.

Low molecular mass polyols of this kind are preferably admixed in minor proportions to the polyol component (A).

Oligomeric and/or polymeric polyols (C) used are, for example, polyester polyols, polyurethane polyols, and polysiloxane polyols, when component (A) is composed exclusively of polyacrylate polyols and/or polymethacrylate polyols.

Catalyst (D)

The coating compositions of the invention preferably comprise at least one catalyst (D) for the crosslinking of the silane groups. Examples are metal complexes with chelate ligands based on zinc or aluminum, such as the titanates or Lewis acids described in WO 05/03340, for example; when selecting the catalysts, however, care should be taken to ensure that the catalysts do not lead to yellowing of the coating compositions. Moreover, a number of catalysts known to be used are less desirable, on toxicological grounds.

It is therefore preferred as catalyst (D) to use phosphorus-containing catalysts, more particularly phosphorus-containing and nitrogen-containing catalysts. In this context use may also be made of mixtures of two or more different catalysts (D).

Examples of suitable phosphorus-containing catalysts (D) are substituted phosphonic diesters and diphosphonic diesters, preferably from the group consisting of acyclic phosphonic diesters, cyclic phosphonic diesters, acyclic diphosphonic diesters, and cyclic diphosphonic diesters. Catalysts of this kind are described in German patent application DE-A-102005045228, for example.

Used more particularly, however, are substituted phosphoric monoesters and phosphoric diesters, preferably from the group consisting of acyclic phosphoric diesters and cyclic phosphoric diesters, more preferably amine adducts of the phosphoric monoesters and diesters.

Very particular preference is given to using, as catalyst (D), the corresponding amine-blocked phosphoric esters, and of these, more particularly, amine-blocked phosphoric acid ethylhexyl esters and amine-blocked phosphoric acid phenyl esters—with especial preference, amine-blocked phosphoric acid bis(2-ethylhexyl) esters.

Particular examples of amines with which the phosphoric esters are blocked include tertiary amines, examples being bicyclic amines, such as, for example, diazabicyclooctane (DABCO), diazabicyclononene (DBN), diazabicycloundecene (DBU), dimethyldodecylamine or triethylamine. Particularly preferred for the blocking of the phosphoric esters are tertiary amines, which ensure high activity of the catalyst under the curing conditions of 140° C.

Particular phosphoric acid catalysts blocked with amine are also available commercially (e.g., Nacure products from King Industries). For example, is mention may be made of Nacure 4167 from King Industries, as a particularly suitable catalyst on the basis of an amine-blocked partial ester of phosphoric acid.

The catalysts are used preferably in fractions of 0.01% to 20%, more preferably in fractions of 0.1% to 10%, by weight, based on the nonvolatile constituents of the coating composition of the invention. Lower activity on the part of the catalyst can be partially compensated by correspondingly higher quantities employed.

The coating compositions of the invention may further comprise another amine catalyst based on a bicyclic amine, more particularly on an unsaturated bicyclic amine. Examples of suitable amine catalysts are 1,5-diazabicyclo[4.3.0]non-5-ene or 1,8-diazabicyclo[5.4.0]undec-7-ene.

These amine catalysts are used preferably in fractions of 0.01% to 20%, more preferably in fractions of 0.1% to 10%, by weight, based on the nonvolatile constituents of the coating composition of the invention.

Suitable solvents for the coating compositions of the invention are more particularly those which within the coating composition are chemically inert toward the compounds (A), (B), and, where used, (C), and which also do not react with (A) and (B) during the curing of the coating composition. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. The aprotic solvents or solvent mixtures preferably have a water content of not more than 1% by weight, more preferably not more than 0.5% by weight, based on the solvent.

Besides the compounds (A), (B), and, where used, (C) it is also possible to use further binders (E) as well, which are preferably able to react with the hydroxyl groups of the poly (meth)acrylate (A) and/or with the free isocyanate groups of the compound (B) and/or with the alkoxysilyl groups of the compounds (B) and/or (C) and to form network nodes.

As component (E) it is possible, for example, to use amino resins and/or epoxy resins. Suitable amino resins include the customary and known amino resins, some of whose methylol and/or methoxymethyl groups may have been defunctionalized by means of carbamate or allophanate groups. Crosslinking agents of this kind are described in patents U.S. Pat. No. 4,710,542 and EP-B-0 245 700 and also in the article by B. Singh and coworkers, "Carbamylmethylated Melamines, Novel Crosslinkers for the Coatings Industry", in Advanced Organic Coatings Science and Technology Series, 1991, Volume 13, pages 193 to 207.

Generally speaking, such components (E) are used in fractions of up to 40%, preferably of up to 30%, more preferably of up to 25%, by weight, based on the nonvolatile constituents of the coating composition.

Furthermore, the binder mixture of the invention or the coating composition of the invention may comprise at least one customary and known coatings additive (F) in effective amounts, i.e., in amounts preferably up to 30%, more preferably up to 25%, and more particularly up to 20%, by weight, based in each case on the nonvolatile constituents of the coating composition.

Examples of suitable coatings additives (F) are as follows:
in particular, UV absorbers;
in particular, light stabilizers such as HALS compounds, benzotriazoles or oxalanilides;
free-radical scavengers;
slip additives;
polymerization inhibitors;
defoamers;
reactive diluents, of the kind which are general knowledge from the prior art, and which are preferably inert toward the —Si(OR)$_3$ groups;
wetting agents such as siloxanes, fluorine compounds, carboxylic monoesters, phosphoric esters, polyacrylic acids and copolymers thereof or polyurethanes;
adhesion promoters such as tricyclodecanedimethanol;
flow control agents;
film-forming assistants such as cellulose derivatives;
fillers such as, for example, nanoparticles based on silicon dioxide, aluminum oxide or zirconium oxide; for further details refer to
Römpp Lexikon "Lacke and Druckfarben", Georg Thieme Verlag, Stuttgart, 1998, pages 250 to 252;
rheology control additives, such as the additives known from patents WO 94/22968, EP-A-0 276 501, EP-A-0 249 201 or WO 97/12945; crosslinked polymeric microparticles, of the kind disclosed, for example, in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils®; or synthetic polymers containing ionic and/or associative groups, such as polyvinyl alcohol, poly(meth)acrylamide, poly(meth)acrylic acid, polyvinylpyrrolidone, styrene-maleic anhydride or ethylene-maleic anhydride copolymers and their derivatives, or hydrophobically modified ethoxylated urethanes or polyacrylates;
flame retardants; and/or
water scavengers.

In another embodiment of the invention, the binder mixture or coating composition of the invention may also comprise other pigments and/or fillers and may serve for the production of pigmented topcoats. The pigments and/or fillers employed for this purpose are known to the skilled worker.

The coatings of the invention that are produced from the coating compositions of the invention adhere outstandingly even to already cured electrocoats, surfacer coats, basecoats or customary and known clearcoats, and are outstandingly suitable, as well as for use in automotive OEM (production-line) finishing, for automotive refinish and/or for the coating of components for installation in or on automobiles, or for the modular scratchproofing of automobile bodies that have already been finished.

The coating compositions of the invention may be applied by any of the customary application methods, such as spraying, knifecoating, spreading, pouring, dipping, impregnating, trickling or rolling, for example. At application, the substrate to be coated may itself be at rest, with the application device or installation being moved. Alternatively the substrate to be coated, more particularly a coil, may be moving, with the application equipment being at rest relative to the substrate or being moved appropriately.

It is preferred to employ spray application methods, such as, for example, compressed air spraying, airless spraying, high-speed rotation, electrostatic spray application (ESTA), alone or in conjunction with hot spray application such as hot air spraying, for example.

The curing of the applied coating compositions of the invention may take place after a certain rest time. The rest time is used, for example, for the leveling and for the devolatilization of the coating films, or for the evaporation of volatile constituents such as solvents. The rest time may be assisted and/or shortened through the application of elevated temperatures and/or through a reduced atmospheric humidity, provided this does not entail any damage or change to the coating films, such as premature complete crosslinking, for instance.

The thermal curing of the coating compositions has no peculiarities of method but instead takes place in accordance with the customary and known methods such as heating in a forced-air oven or irradiation using IR lamps. This thermal curing may also take place in stages. Another preferred curing method is that of curing with near infrared (NIR radiation).

The thermal curing takes place advantageously at a temperature of 30 to 200° C., more preferably 40 to 190° C., and more particularly 50 to 180° C., for a time of 1 minute up to 10 hours, more preferably 2 minutes up to 5 hours, and more particularly 3 minutes to 3 hours; at the temperatures employed for automotive refinish and for the coating of plastics parts, which preferably lie between 30 and 90° C., it is also possible for longer curing times to be employed.

The coating compositions of the invention feature high solids content and provide new cured coatings, more particularly coating systems, especially clearcoat systems, moldings, especially optical moldings, and self-supporting sheets that are highly scratch-resistant, even after long-term exposure. At the same time, the coatings obtained in accordance with the invention also have a very good overall appearance. Finally, the coatings and coating systems of the invention, especially the clearcoat systems, can be produced even at film thicknesses >40 µm without stress cracks occurring.

The coating compositions of the invention are therefore outstandingly suitable as decorative, protective and/or effect-imparting, highly scratch-resistant coatings and coating systems on bodywork of means of transport (more particularly motor vehicles, such as motorcycles, buses, trucks or automobiles) or of parts thereof; of buildings, in the interior and exterior; of furniture, windows, and doors; of plastics moldings, more particularly CDs and windows; of small industrial parts, of coils, containers, and packaging; of white goods; of films; of optical, electrical, and mechanical components; and also of hollow glassware and articles of everyday use.

More particularly the coating compositions and coating systems of the invention, especially the clearcoats, are employed in the technologically and esthetically particularly demanding field of automotive OEM finishing and for the coating of plastics parts for installation in or on automobile bodies, particularly for top-class automobile bodies, such as, for example, for the production of roofs, tailgates, hoods, fenders, bumpers, spoilers, sills, protective strips, side trim, and so on, and also for automotive refinish.

The plastics parts are composed typically of ASA, polycarbonates, blends of ASA and polycarbonates, polypropylene, polymethyl methacrylates or impact-modified polymethyl methacrylates, more particularly of blends of ASA and polycarbonates, used preferably with a polycarbonate fraction >40%, more particularly >50%.

By ASA is meant, generally, impact-modified styrene/acrylonitrile polymers where graft copolymers of vinylaromatic compounds, especially styrene, and of vinyl cyanides, especially acrylonitrile, on polyalkyl acrylate rubbers are present in a copolymer matrix comprising, in particular, styrene and acrylonitrile.

With particular preference the coating compositions of the invention are employed in multistage coating processes, more particularly in processes is in which an optionally precoated substrate is coated first with a pigmented basecoat, after which a coat with the coating composition of the invention is applied. The invention accordingly also provides multicoat color and/or effect paint systems comprising at least one pigmented basecoat and at least one clearcoat disposed thereon, which are characterized in that the clearcoat has been produced from the coating composition of the invention.

Not only water-thinnable basecoat materials but also basecoat materials based on organic solvents can be used. Suitable basecoat materials are described, for example, in EP-A-0 692 007 and in the documents listed therein at column 3 lines 50ff. Preferably the applied basecoat material is first dried, which means that the basecoat film, in an evaporation phase, has at least some of the organic solvent and/or water removed from it. Drying takes place preferably at temperatures from room temperature to 80° C. After the drying, the coating composition of the invention is applied. The two-coat system is subsequently baked preferably under conditions which are employed in the context of automotive OEM finishing, at temperatures of 30 to 200° C., more preferably 40 to 190° C., and more particularly 50 to 180° C., for a time of 1 minute up to 10 hours, more preferably 2 minutes up to 5 hours, and more particularly 3 minutes to 3 hours; at the temperatures employed for automotive refinish, which preferably lie between 30 and 90° C., longer curing times may also be employed.

In another preferred embodiment of the invention, the coating composition of the invention is used as a transparent clearcoat material for coating plastics substrates, more particularly plastics parts for installation in or on a vehicle. These parts are preferably likewise coated in a multistage coating method, in which an optionally precoated substrate or a substrate pretreated for improved adhesion of the subsequent coats (for example, by flame, corona or plasma treatment of the substrate) is first coated with a pigmented basecoat, after which a layer with the coating composition of the invention is applied.

Finally, the coating composition of the invention is used as a transparent clearcoat material for coating transparent plastics substrates. In this case the coating compositions comprise UV absorbers which in terms of their quantity and type are designed for the effective UV protection of the plastics substrate.

EXAMPLES

Preparation of a Poly(Meth)Acrylate Resin with Hydroxyl Groups (A1)

A double-walled 4 l stainless steel tank which can be heated by means of an oil circulation thermostat and is equipped with thermometer, anchor stirrer, 2 dropping funnels, and reflux condenser is charged with solvent for the polymerization. One of the dropping funnels is charged with the monomer mixture, the second dropping funnel with the initiator solution, comprising a suitable initiator (generally a peroxide). The initial charge is heated to a polymerization temperature of 140° C. When the polymerization temperature is reached, first of all the initiator feed is commenced. 15 minutes after the start of the initiator feed, the monomer feed (duration: 240 minutes) is commenced. The initiator feed is set such that it continues for 30 minutes after the end of the monomer feed. After the end of the initiator feed, the mixture is stirred at 140° C. for a further 2 hours and then cooled to room temperature. The reaction mixture is subsequently adjusted with solvent to the solids content specified in table 2.

TABLE 1

Composition of the polymethacrylate (A1) in parts by weight

| Component | Part(s) by weight |
|---|---|
| Styrene | 8.0 |
| n-Butyl methacrylate | 8.0 |
| Acrylic acid | 0.6 |
| 4-Hydroxybutyl acrylate | 12.0 |
| 2-Hydroxyethyl acrylate | 12.0 |
| n-Butyl acrylate | 19.0 |

TABLE 2

Characteristics of the polymethacrylate (A1) (acid number and viscosity determined experimentally, OH number and Tg calculated theoretically)

| | |
|---|---|
| Solids 1 h 150° C. | 65% |
| Acid No. (measured) [mg KOH/g] | 8-12 |
| OH number calculated [mg KOH/g] | 175 |
| Tg (FOX) [° C.] | −27 |
| Viscosity [mPa · s] [1] | 2200 |

[1] determined at room temperature to DIN53229 with a Brookfield cone/plate viscometer, cone 3

Preparation of a Low-viscosity, Caprolactone-modified Poly(Meth)Acrylate Resin with Hydroxyl Groups (A2)

A stainless-steel stirring vessel with anchor stirrer and reflux condenser is charged with 290 g of butyl acetate and 290 g of solvent naphtha, and this initial charge is heated to 167° C. under a nitrogen atmosphere and with stirring, at a pressure of 3.5 bar absolute. A solution of 288.8 g of di-tert-amyl peroxide and 10.7 g of butyl acetate and 10.8 g of solvent naphtha is added dropwise over 275 minutes. The monomer mixture of 400 g of styrene, 550 g of butyl methacrylate, 803.3 g of hydroxyethyl acrylate, 550 g of ethylhexyl acrylate, and 102.9 g of acrylic acid is added dropwise at a uniform rate over the course of 240 minutes. The monomer feed is commenced 5 minutes after the initiator feed. After the end of the feeds, the reactor contents are held at 167° C. for a further 20 minutes and then 993 g of caprolactone are metered in over the course of an hour, during which the reactor temperature is lowered evenly to 150° C. After the end of the feed, stirring is continued at 150° C. for 1.5 hours. Thereafter the contents of the reactor are cooled, the pressure is let down at a temperature below 121° C., and, at 80° C., the reactor is emptied. The resulting polymer solution has a solids of 81.2% with a viscosity of 2400 mPa·s. The binder has a mass-average molar mass of 5300 g/mol with a polydispersity of 3.0 (determined by GPC against polystyrene calibration).

TABLE 3

Composition of the polymethacrylate (A2) in parts by weight

| Component | Parts by weight |
|---|---|
| Styrene | 16.6 |
| n-Butyl methacrylate | 22.9 |
| Acrylic acid | 4.3 |
| Ethylhexyl acrylate | 22.9 |
| 2-Hydroxyethyl acrylate | 33.4 |

TABLE 4

Characteristics of the polymethacrylate (A2) (acid number determined experimentally, OH number determined experimentally)

|  | A2 |
|---|---|
| Solids [%] (1 h 130° C.) | 81.2 |
| Acid number [mg KOH/g] | 27.6 |
| OH number [mg KOH/g] | 122 |
| Viscosity [mPa · s] [1] | 2400 |

[1] determined at room temperature to DIN53229 with a Brookfield cone/plate viscometer, cone 3

Preparation of an Inventive Curing Agent (B1) Based on a Dimeric, HDI-based Uretdione (10 Mol % of Monosilane Structures IIa and 90 Mol % of Bissilane Structures IIIa: Degree of Conversion of the Isocyanate Groups c=40 Mol %)

A steel reactor equipped with a reflux condenser and a thermometer is charged with 48.3 parts of dimerized hexamethylene diisocyanate (HDI) containing uretdione groups (Desmodur N3400 from Bayer), 12.1 parts of butyl acetate, and 2.4 parts of triethyl orthoformate. From a dropping funnel, a mixture of 30.7 parts of bis[3-(trimethoxysilyl)propyl]amine (Dynasylan 1124, Evonik, Rheinfelden) and 2.4 parts of trimethoxysilyl-propyl-n-butylamine (Dynasylan 1189, Evonik, Rheinfelden) is then added dropwise under nitrogen blanketing and with stirring. A slight rise in temperature to around 40° C. is observed. After 2-hour stirring, the NCO value is determined by titrimetry: NCO content: 6.6% (solution). The nonvolatile fraction (1 h, 150° C.) is 85%.

Preparation of a Noninventive Curing Agent (BV1) Based on Narrow-distribution HDI-based Isocyanurate (10 Mol % of Monosilane Structures IIa and 90 Mol % of Bissilane Structures IIIa: Degree of Conversion of the Isocyanate Groups c=40 Mol %)

A steel reactor equipped with a reflux condenser and a thermometer is charged with 57.6 parts of trimerized hexamethylene diisocyanate (HDI) (Desmodur N3600 from Bayer), 14.8 parts of butyl acetate, and 2.8 parts of triethyl orthoformate. From a dropping funnel, a mixture of 39.4 parts of bis[3-(trimethoxysilyl)propyl]amine (Dynasylan 1124, Evonik, Rheinfelden) and 3.0 parts of trimethoxysilylpropyl-n-butylamine (Dynasylan 1189, Evonik, Rheinfelden) is then added dropwise under nitrogen blanketing and with stirring. A slight rise in temperature to around 40° C. is observed. After 2-hour stirring, the NCO value is determined by titrimetry: NCO content: 6.6% (solution); nonvolatile fraction (1 h, 150° C.): 85%.

Preparation of a Noninventive Curing Agent (BV2) Based on Broad-distribution HDI-based Isocyanurate (10 Mol % of Monosilane Structures IIa and 90 Mol % of Bissilane Structures IIIa: Degree of Conversion of the Isocyanate Groups c=40 Mol %)

A steel reactor equipped with a reflux condenser and a thermometer is charged with 67.6 parts of trimerized hexamethylene diisocyanate (HDI) (Desmodur N3300 from Bayer), 16.9 parts of butyl acetate, and 3.4 parts of triethyl orthoformate. From a dropping funnel, a mixture of 43.0 parts of bis[3-(trimethoxysilyl)propyl]amine (Dynasylan 1124, Evonik, Rheinfelden) and 3.3 parts of trimethoxysilylpropyl-n-butylamine (Dynasylan 1189, Evonik, Rheinfelden) is then added dropwise under nitrogen blanketing and with stirring. A slight rise in temperature to around 40° C. is observed. After 2-hour stirring, the NCO value is determined by titrimetry: NCO content: 6.6% (solution); nonvolatile fraction (1 h, 150° C.): 85%.

Formulation of the Inventive Coating Compositions B1 and B2 and the Coatings of the Inventive Examples 1 and 2, and of Coating Compositions CB1 to CB4 of Comparative Examples C1 to C4, and the Coatings of Comparative Examples C1 to C4

In the order indicated (beginning from the top), the constituents indicated in table 5 and table 6 are combined intimately with one another in an appropriate vessel and immediately thereafter are coated onto a metal mirror plate coated with black basecoat (basecoat drying: 30 minutes at 80° C., 10-minute flash-off time). Thereafter the sheets are dried in an oven at 60° C. for 30 minutes. The coatings obtained are stored at room temperature for 24 hours and subjected to measurement with a Wave-Scan® from BYK-Gardner. The test results are set out in table 7 and table 8.

TABLE 5

Composition of the inventive coating composition B1 and of coating compositions CB1 and CB2 of comparative examples C1 and C2, in each case based on the hydroxyl-containing polymethacrylate (A1)

|  | Example B1 | Comp. ex. CB1 | Comp. ex. CB2 |
|---|---|---|---|
| Polyacrylate (A1) | 40 | 40 | 40 |
| Dynoadd F1 [1] | 0.2 | 0.2 | 0.2 |
| Tinuvin ® 384 [2] | 0.5 | 0.5 | 0.5 |
| Tinuvin ® 292 [3] | 0.5 | 0.5 | 0.5 |
| Butyl acetate | 8 | 8 | 8 |
| Nacure 4167 ® [4] | 1.2 | 1.2 | 1.2 |
| Curing agent B1 | 50 |  |  |
| Curing agent BV1 (comp.) |  | 50 |  |
| Curing agent BV2 (comp.) |  |  | 50 |
| Nonvolatile fraction (1 h, 150° C.) | 70% | 70% | 70% |

[1] Dynoadd F1 = commercial, multifunctional, surface-active additive from HertfelderGmbH, Bielefeld
[2] Tinuvin ® 384 = commercial light stabilizer based on a benzotriazole, from Ciba
[3] Tinuvin ® 292 = commercial light stabilizer based on a sterically hindered amine, from Ciba
[4] Nacure ® 4167 = commercial catalyst based on amine-blocked phosphoric acid partial ester, from King Industries, nonvolatile fraction 25%

TABLE 6

Composition of the coating compositions B2, CB3 and CB4, in each case based on the hydroxyl-containing, caprolactone-modified polymethacrylate (A2)

|  | Example B2 | Comp. ex. CB3 | Comp. ex. CB4 |
|---|---|---|---|
| Polyacrylate (A2) | 41 | 41 | 41 |
| Dynoadd F1 [1] | 0.2 | 0.2 | 0.2 |
| Tinuvin ® 384 [2] | 0.5 | 0.5 | 0.5 |
| Tinuvin ® 292 [3] | 0.5 | 0.5 | 0.5 |
| Butyl acetate | 8 | 8 | 8 |
| Nacure 4167 ® [4] | 1 | 1 | 1 |
| Curing agent B1 | 45 | | |
| Curing agent BV1 (comp.) | | 45 | |
| Curing agent BV2 (comp.) | | | 45 |
| Nonvolatile fraction (1 h, 150° C.) | 75% | 75% | 75% |

TABLE 7

Test results for the coatings

|  | Basecoat sheet 1 without clearcoat | Example B1 on basecoat sheet 1 | Basecoat sheet 2 without clearcoat | Comp. ex. CB1 on basecoat sheet 2 | Basecoat sheet 3 without clearcoat | Comp. ex. CB2 on basecoat sheet 3 |
|---|---|---|---|---|---|---|
| FT (μm) | 15 | 39 | 15 | 41 | 16 | 39 |
| SW | 8.0 | 1.7 | 8.1 | 10.3 | 7.8 | 85.4 |
| LW | 2.4 | 2.2 | 2.6 | 14.6 | 2.4 | 60.3 |

TABLE 8

Test results for the coatings of inventive example 2 and for the coatings of comparative examples C3 and C4

|  | Basecoat sheet 4 without clearcoat | Example B2 on basecoat sheet 4 | Basecoat sheet 5 without clearcoat | Comp. ex. CB3 on basecoat sheet 5 | Basecoat sheet 6 without clearcoat | Comp. ex. CB4 on basecoat sheet 6 |
|---|---|---|---|---|---|---|
| FT (μm) | 15 | 39 | 15 | 41 | 17 | 39 |
| SW | 8.3 | 1.6 | 8.1 | 9.7 | 8.7 | 18.9 |
| LW | 2.4 | 0.7 | 2.2 | 21.3 | 2.2 | 25.5 |

All of the coatings are dry to touch after the drying described (30 minutes at 60° C.). Any incidence of tacky films under deviant optimal laboratory conditions can be remedied easily by slightly increased quantities of catalyst and/or more effective catalysts.

Summary of the Test Results:

The comparison both of the long-wave values (LW) and of the short-wave values (SW) in table 7 for inventive example 1 with those for comparative example C1 and for comparative example C2 shows that inventive example 1 exhibits substantially better values than comparative examples C1 and C2, i.e., that the inventive coating composition B1 exhibits substantially better flow than the coating compositions of comparative examples C1 and C2.

Analogously, the comparison both of the long-wave values (LW) and of the short-wave values (SW) in table 8 for inventive example 2 with those for comparative example C3 and for comparative example C4 also shows that inventive example 2 exhibits substantially better values than comparative examples C3 and C4, i.e., that the inventive coating composition B2 exhibits substantially better flow than the coating compositions of comparative examples C3 and C4.

Moreover, through a comparison of the inventive coating composition B1 with the inventive coating composition B2, it is apparent that, with a caprolactone-modified binder (A2), the nonvolatile fraction of the coating composition can be increased further and that the resultant coating of example B2, in spite of the increased nonvolatile fraction of the coating composition B2, exhibits an optical quality whose attractiveness is consistent with that of the coating of example 1.

Preparation of an Inventive Curing Agent (B2) Based on a Dimeric, HDI-based Uretdione (20 Mol % of Monosilane Structures IIa and 80 Mol % of Bissilane Structures IIIa: Degree of Conversion of the Isocyanate Groups c=40 Mol %)

A steel reactor equipped with a reflux condenser and a thermometer is charged with 50 parts of dimerized hexamethylene diisocyanate (HDI) containing uretdione groups (Desmodur N3400 from Bayer), 16 parts of butyl acetate, and 3 parts of triethyl orthoformate. From a dropping funnel, a mixture of 24 parts of bis[3-(trimethoxysilyl)propyl]amine (Dynasylan 1124, EVONIK, Rheinfelden) and 8 parts of trimethoxysilylpropyl-n-butyl-amine (Dynasylan 1189, EVONIK, Rheinfelden) is then added dropwise under nitrogen blanketing and with stirring. A slight rise in temperature to around 40° C. is observed. After 2-hour stirring, the NCO value is determined by titrimetry.

Nonvolatile fraction (1 h, 150° C.): 80%,

NCO content: 6.1% (solution).

Preparation of an Isocyanurate-group-containing Iscoyanate Curing Agent (BS1)

40 parts by weight of a commercial trimerized polyisocyanate containing isocyanurate groups and based on hexamethylene diisocyanate (Desmodur® N3600 from Bayer) and 10 parts of butyl acetate are mixed with one another by stirring to give a solution having a solids content of 80.0% by weight.

Preparation of an Isocyanurate-Group-Containing Curing Agent (BS2) Based on a Trimeric, HDI-based Isocyanurate (20 Mol % of Monosilane Structures IIa and 80 Mol % of Bissilane Structures IIIa: Degree of Conversion of the Isocyanate Groups c=40 Mol %)

A steel reactor equipped with a reflux condenser and a thermometer is charged with 50 parts of trimerized hexamethylene diisocyanate (HDI) containing isocyanurate groups (Desmodur N3600 from Bayer), 16 parts of butyl acetate, and 3 parts of triethyl orthoformate. From a dropping funnel, a mixture of 24 parts of bis[3-(trimethoxysilyl)propyl]amine (Dynasylan 1124, EVONIK, Rheinfelden) and 8 parts of trimethoxysilylpropyl-n-butylamine (Dynasilan 1189, EVONIK, Rheinfelden) is then added dropwise under nitrogen blanketing and with stirring. A slight rise in temperature to around 40° C. is observed. After 2-hour stirring, the NCO value is determined by titrimetry.

Nonvolatile fraction (1 h, 150° C.): 80%,

NCO content: 6.3% (solution).

By mixing the quantities indicated in table 9 of the silanized uretdione (B2) and of the isocyanurate-group-containing isocyanate (BS1) or (BS2), respectively, the curing agent mixtures H1 and H2 listed in table 9 are produced.

TABLE 9

Composition in parts by weight, solids content, isocyanate content, and viscosity of the curing agent mixtures H1 and H2

| Curing agent mixture | Uretdione B2 | Isocyanurate BS1 | Isocyanurate BS2 | B2:BS in % by weight | Isocyanate content of the mixture [%] | Solids of the mixture [%] | Viscosity [mPa · s] |
|---|---|---|---|---|---|---|---|
| H1 | 50 | 50 | | 50:50 | 12.0 | 80 | 87 |
| H2 | 50 | | 50 | 50:50 | 6.6 | 80 | 166 |

Calculation of the Ratios of the Uretdione-group-containing Compound B2 to the Isocyanurate-Group-Containing Compound BS1 or BS2 in Equivalents for the Curing Agent Mixtures H1 and H2

Calculation of the equivalent weight of Desmodur® N3400 according to technical datasheet: (100 * 42 g)/21.8=193 g Calculation of the equivalent weight of Desmodur® N3600 according to technical datasheet: (100 * 42 g)/23=183 g Calculated equivalent weight of bis[3-(trimethoxysilyl)propyl]amine: 341 g Calculated equivalent weight of trimethoxysilylpropyl-n-butylamine: 234 g Calculation of the Equivalent Weight for the Uretdione-Group-Containing Compound B2:

Degree of conversion c in B2 to silane units: 40 mol %

Fraction as2 in B2 of the isocyanate groups reacted with monosilane:

(amount of monosilane in mol %)/[total fraction (monosilane+bissilane)=100 mol %]=0.2

Fraction as3 in B2 of the isocyanate groups reacted with bissilane:

(amount of bissilane in mol %)/[total fraction(monosilane+bissilane)=100 mol %]=0.8

Equivalent weight for the uretdione-group-containing compound B2:

[193 g (equivalent weight of Desmodur® N3400)]+ 0.4*[(0.2*234 g)+(0.8*341 g)]=321 g Calculation of the Equivalent Weight for the Isocyanurate-group-containing Compound BS1:

Degree of conversion c' in BS1 to silane units: 0 mol %

Fraction as'2 in BS1 of the isocyanate groups reacted with monosilane:

(amount of monosilane in mol %)/[total fraction (monosilane+bissilane)=100 mol %]=0

Fraction as'3 in BS1 of the isocyanate groups reacted with bissilane:

(amount of bissilane in mol %)/[total fraction(monosilane+bissilane)=100 mol %]=0

Equivalent weight for the isocyanurate-group-containing compound BS1:

[183 g (equivalent weight of Desmodur® N3600)]+0* [(0*234 g)+(0*341 g)]=183 g

Calculation of the Equivalent Weight for the Isocyanurate-group-containing Compound BS2:

Degree of conversion c' in BS2 to silane units: 40 mol %

Fraction as'2 in BS2 of the isocyanate groups reacted with monosilane:

(amount of monosilane in mol %)/[total fraction (monosilane+bissilane)=100 mol %]=0.2

Fraction as'3 in BS2 of the isocyanate groups reacted with bissilane:

(amount of bissilane in mol %)/[total fraction(monosilane+bissilane)=100 mol %]=0.8

Equivalent weight for the isocyanurate-group-containing compound BS2:

[183 g (equivalent weight of Desmodur® N3600)]+ 0.4*[(0.2*234 g)+(0.8*341 g)]=311 g Calculation of the ratio of the curing agent mixture H1 (50 parts by to weight of compound B2 and 50 parts by weight of compound BS1) in equivalents of B2 to equivalents of BS1: 1.0:1.75

$$\frac{\text{Equivalents of } B2}{\text{Equivalents of } BS1} = \frac{50/321}{50/183} = \frac{183}{321} = \frac{1.0}{1.75}$$

Calculation of the ratio of the curing agent mixture H2 (50 parts by weight of compound B2 and 50 parts by weight of compound BS2) in equivalents of B2 to equivalents of BS2: 1.0:1.03

$$\frac{\text{Equivalents of } B2}{\text{Equivalents of } BS2} = \frac{50/321}{50/311} = \frac{50*311}{50*321} = \frac{1.0}{1.03}$$

Formulation of the Inventive Coating Compositions B3 and B4 and the Coatings of the Inventive Examples 3 and 4

In the order indicated (beginning from the top), the constituents indicated in table 10 are combined intimately with one another in an appropriate vessel and immediately thereafter are coated onto a metal mirror plate coated with black basecoat (basecoat drying: 30 minutes at 80° C., 10-minute flash-off time). Thereafter the sheets are dried in an oven at 60° C. for 30 minutes. The coatings obtained are stored at room temperature for 24 hours and are subjected to measurement with a Wave-Scan® from BYK-Gardner. The test results are set out in table 11.

TABLE 10

Composition of the inventive coating compositions B3 and B4, in each case based on the hydroxy-containing polymethacrylate (A1)

| | Example B3 | Example B4 |
|---|---|---|
| Polyacrylate (A1) | 95 | 95 |
| Byk 333 [1] | 0.4 | 0.4 |
| Tinuvin ® 384 [2] | 1.0 | 1.0 |
| Tinuvin ® 292 [3] | 1.0 | 1.0 |
| Nacure 4167 ® [4] | 2.6 | 2.6 |
| Curing agent H1 | 65 | |
| Curing agent H2 | | 120 |
| Nonvolatile fraction (1 h, 150° C.) | 70.9 | 73.2 |

TABLE 10-continued

Composition of the inventive coating compositions B3 and B4, in each case based on the hydroxy-containing polymethacrylate (A1)

|  | Example B3 | Example B4 |
|---|---|---|
| Butyl acetate | 2 | 10 |
| Nonvolatile fraction (1 h, 150° C.) | 70% | 70% |

[1] Byk 333 = commercial surface-active additive from Byk Chemie
[2] Tinuvin ® 384 = commercial light stabilizer based on a benzotriazole, from Ciba
[3] Tinuvin ® 292 = commercial light stabilizer based on a sterically hindered amine, from Ciba
[4] Nacure ® 4167 = commercial catalyst based on amine-blocked phosphoric acid partial ester, from King Industries, nonvolatile fraction 25%

TABLE 11

Test results for the coatings of examples B3 and B4

|  | Basecoat sheet 1 without clearcoat | Example B3 on basecoat sheet 1 | Basecoat sheet 2 without clearcoat | Example B4 on basecoat sheet 2 |
|---|---|---|---|---|
| FT (µm) | 15 | 40 | 15 | 40 |
| SW | 8.0 | 6.2 | 8.0 | 4.8 |
| LW | 2.2 | 1.2 | 2.2 | 1.4 |

All of the coatings are dry to touch after the drying described (30 minutes at 60° C.). Any incidence of tacky films under deviating optimal laboratory conditions can be remedied easily by slightly increased quantities of catalyst and/or more effective catalysts.

Summary of the Test Results:

With the inventive curing agent mixtures H1 and H2, therefore, very good leveling can be achieved at the target film thickness of 40 µm, even with high solids contents. Furthermore, the inventive coating compositions ensure rapid curing even under the conditions of repair coatings, i.e., the coatings are dry to touch after drying at 60° C. for 30 minutes.

The invention claimed is:

1. A coating composition based on aprotic solvents and comprising
at least one oligomeric and/or polymeric, hydroxyl-containing compound (A) and
at least one compound (B) comprising isocyanate groups, and at least one silane group of the formula (I)

—X—Si—R''$_x$G$_{3-x}$    (I)

with
G=identical or different hydrolyzable groups having a substituent R',
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl,
X=organic radical,
R''=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
x=0 to 2,
and characterized in that
(i) the compound (B) containing isocyanate groups and silane groups comprises uretdione groups, and
(ii) the compound (B) has been prepared from a linear aliphatic diisocyanate (DI).

2. The coating composition of claim 1, further comprising wherein the compound (B) has been prepared from a linear aliphatic diisocyanate (DI) having 3 to 12 C atoms.

3. The coating composition of claim 2, further comprising wherein the compound (B) has been prepared from a linear aliphatic diisocyanate (DI) having 5 to 6 C atoms.

4. The coating composition of claim 1, further comprising wherein the compound (B) has been prepared from a polyisocyanate (PI) having a uretdione group content >50 mol %, based in each case on the entirety of the product formed by isocyanate oligomerization of the linear aliphatic diisocyanate (DI).

5. The coating composition of claim 4, further comprising wherein the total fraction of the isocyanate groups in the polyisocyanate (PI) that are reacted to form the structural units (II) and/or (III) is between 5 and 95 mol %.

6. The coating composition of claim 4, further comprising wherein the compound (B) has been prepared from a polyisocyanate (PI) having a uretdione group content of from 65 to 80 mol %, based in each case on the entirety of the reaction product formed by isocyanate oligomerization of the linear aliphatic diisocyanate (DI).

7. The coating composition claim 1, further comprising wherein the compound (B) has
between 10 and 97.5 mol %, based on the entirety of the structural units (II) and (III), of at least one structural unit of the formula (II)

—NR—(X—SiR''$x$(OR')$_{3-x}$)    (II)

and
between 10 and 97.5 mol %, based on the entirety of the structural units (II) and (III), of at least one structural unit of the formula (III)

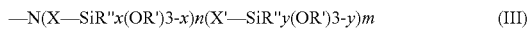
—N(X—SiR''$x$(OR')$_{3-x}$)$n$(X'—SiR''$y$(OR')$_{3-y}$)$m$    (III)

where
R=hydrogen, alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, X, X'=linear and/or branched alkylene or cycloalkylene radical having 1 to 20 carbon atoms,
R''=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
n=0 to 2, m=0 to 2, m+n=2, and
x, y=0 to 2.

8. The coating composition of claim 1, further comprising wherein the compound (B) is the reaction product of the uretdione of 1,6-hexamethylene diisocyanate with bis(3-propyltrimethoxysilyl)amine and N-(3-(trimethoxysilyl)propyl)butylamine.

9. The coating composition of claim 1, further comprising wherein the hydroxyl-containing compound (A) is selected from the group consisting of polyacrylate polyols, polymethacrylate polyols, polyester polyols, polyurethane polyols, polysiloxane polyols, and combinations of two or more of the foregoing.

10. The coating composition of claim 1, further comprising as compound (A) a member selected from the group consisting of lactone-modified, hydroxyl-containing, oligomeric and/or polymeric compounds (A).

11. The coating composition of claim 1, further comprising a phosphorus-containing catalyst for the crosslinking of the silane groups.

12. The coating composition of claim 1, further comprising one or more compounds (BS) which are different from component (B) and which have free and/or blocked isocyanate groups.

13. The coating composition of claim 12, further comprising wherein the mixture ratio of the uretdione-group-containing component (B) to the component (BS) is between 1.0 equivalent of component (B) to 40.0 equivalents of component (BS) and 1.0 equivalent of component (B) to 0.01 equivalents of component (BS).

14. The coating composition of claim 13, further comprising wherein the mixture ratio of the uretdione-group-containing component (B) to the component (BS) is between 1.0 equivalent of component (B) to 25.0 equivalents of component (BS) and 1.0 equivalent of component (B) to 0.05 equivalents of component (BS).

15. A multistage coating method, comprising applying a pigmented basecoat film to an optionally precoated substrate and thereafter applying a layer of the coating composition of claim 1.

16. The multistage coating method of claim 15, further comprising following application of the pigmented basecoat film by drying of the applied basecoat initially at temperatures from room temperature to 80° C., and application of the coating composition is followed by curing at temperatures from 30 to 90° C. for a time of 1 minute to 10 hours.

17. The method of claim 15 wherein the coating composition is a clearcoat and the substrate is selected from the group consisting of automotive substrates, automotive refinish substrates, automotive component substrates, plastic substrates, and combinations of the foregoing.

18. The method of claim 17 wherein the substrate is a plastic substrate.

19. The coating composition of claim 1 further comprising wherein
G=is selected from the group consisting of identical or different alkoxy groups of the formula (OR'),
R'=is an alkyl group selected from the group consisting of ethyl and methyl,
X=alkylene radical having 1 to 4 carbon atoms,
R"=alkyl radical having 1 to 6 C atoms,
x=0.

20. A coating composition based on aprotic solvents and comprising
at least one oligomeric and/or polymeric, hydroxyl-containing compound (A) and
at least one compound (B) comprising isocyanate groups, and at least one silane group of the formula (I)

$$-X-Si-R''_xG_{3-x} \quad (I)$$

with
G=identical or different hydrolyzable groups selected from the group consisting of alkoxy groups of the formula (OR'),
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl,
X=organic radical,
R"=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
x=0 to 2,
and characterized in that
(iii) the compound (B) containing isocyanate groups and silane groups comprises uretdione groups, and
(iv) the compound (B) has been prepared from a linear aliphatic diisocyanate (DI).

* * * * *